No. 853,219. PATENTED MAY 14, 1907.
W. M. BRADSHAW.
TERMINAL BLOCK FOR ELECTRICAL APPARATUS.
APPLICATION FILED APR. 28, 1906.

2 SHEETS—SHEET 1.

WITNESSES:

INVENTOR
William M. Bradshaw
BY
ATTORNEY

No. 853,219. PATENTED MAY 14, 1907.
W. M. BRADSHAW.
TERMINAL BLOCK FOR ELECTRICAL APPARATUS.
APPLICATION FILED APR. 28, 1906.

2 SHEETS—SHEET 2.

WITNESSES:
C. L. Belcher
Otto S. Schairer

INVENTOR
William M. Bradshaw
BY
Hesley S. Carr
ATTORNEY

UNITED STATES PATENT OFFICE.

WILLIAM M. BRADSHAW, OF WILKINSBURG, PENNSYLVANIA, ASSIGNOR TO WESTINGHOUSE ELECTRIC & MANUFACTURING COMPANY, A CORPORATION OF PENNSYLVANIA.

TERMINAL BLOCK FOR ELECTRICAL APPARATUS.

No. 853,219.  Specification of Letters Patent.  Patented May 14, 1907.

Application filed April 28, 1906. Serial No. 314,211.

*To all whom it may concern:*

Be it known that I, WILLIAM M. BRADSHAW, a citizen of the United States, and a resident of Wilkinsburg, in the county of Allegheny and State of Pennsylvania, have invented a new and useful Improvement in Terminal Blocks for Electrical Apparatus, of which the following is a specification.

My invention relates to windings and terminal blocks for electrical translating devices and particularly to those that are employed in electrical measuring instruments.

The object of my invention is to provide a convenient and compact structure and arrangement of the windings and terminal blocks for electrical measuring instruments and other translating devices which may be readily assembled.

Electrical measuring instruments that are employed for measuring the energy of polyphase circuits frequently comprise two instruments of the character that are employed to measure the energy of single-phase circuits, the movable members of which are connected together. Instruments of this class are usually provided with windings that are arranged in series with the external circuit, and when adapted to be supplied with large amounts of current, that are formed of comparatively large and inflexible conductors. In such cases it is desirable to secure rigidly thereto, or to form integral therewith, terminal pieces having clamping means, and when two series windings are employed in a polyphase or other single instrument, it is futher desirable that they be disposed in such close proximity to each other as to enable the employment of terminal blocks of convenient and compact structure.

It is the object of the present invention to construct and arrange the parts in this manner.

Figure 1:
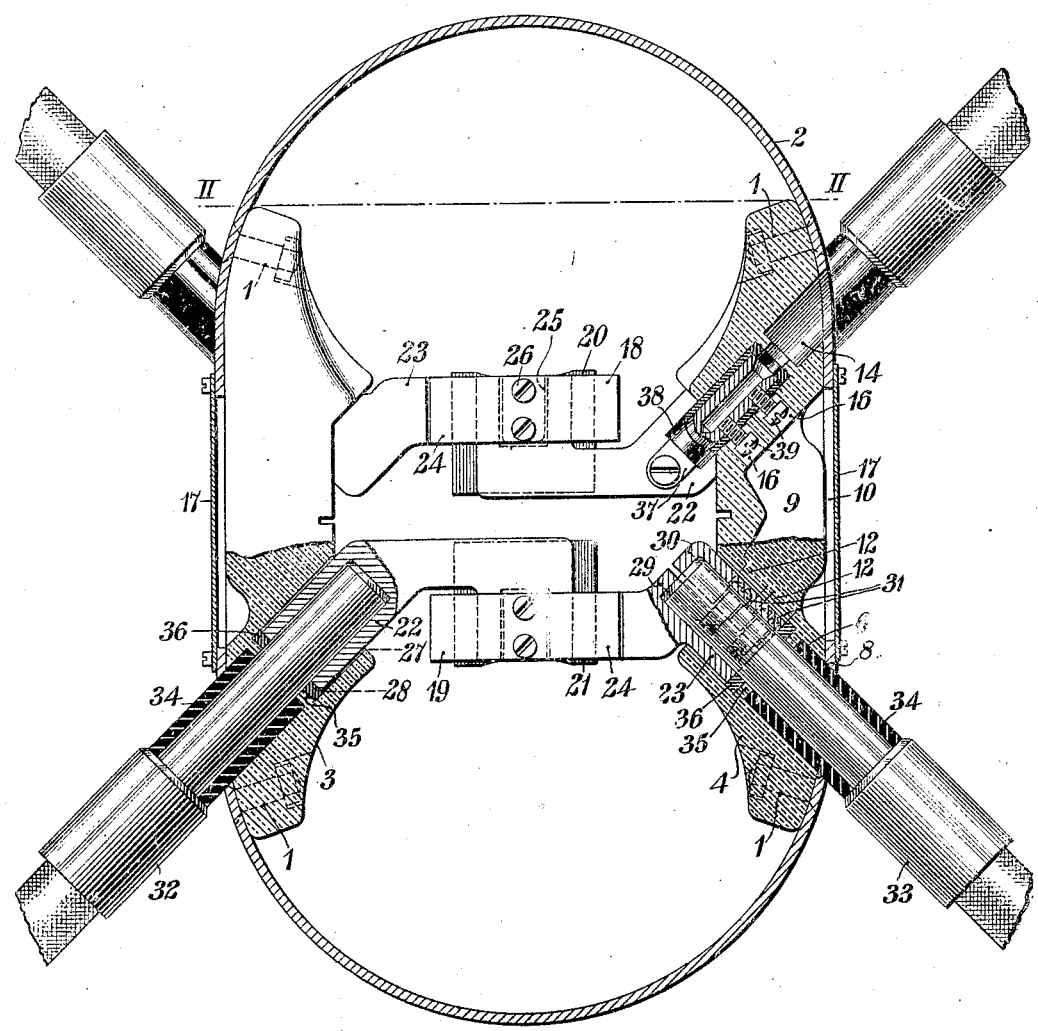
Figure 2:
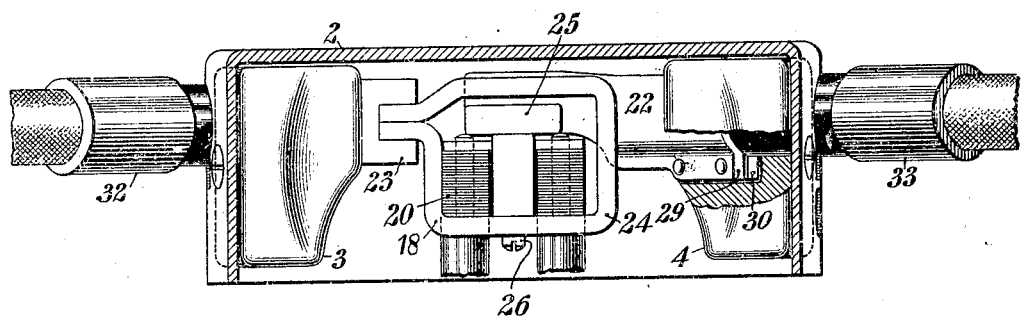
Figure 3:
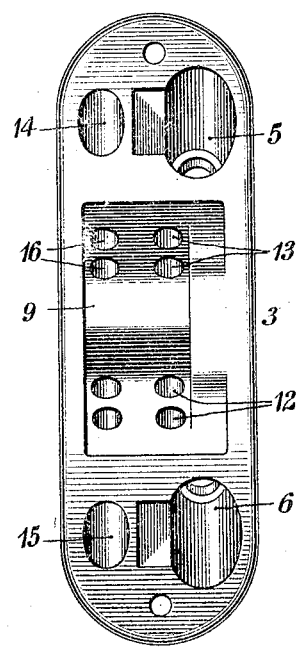

Figure 1 of the accompanying drawings is a view, in rear elevation, of a portion of an instrument that embodies my invention, certain of the parts being broken away for the sake of clearness of illustration. Fig. 2 is a view in section on the line II—II of Fig. 1 and Fig. 3 is a view in side elevation of one of the parts of the instrument shown in Figs. 1 and 2.

Secured by means of bolts 1 to the longer sides of an oblong casing 2, for the parts of an instrument that embodies my invention, are two porcelain or glass terminal blocks 3 and 4 each of which is provided with openings at 5 and 6 that diverge outwardly from each other at an angle of approximately 90° and register with corresponding apertures 8 in the sides of the casing 2. The blocks are also provided with recesses 9 that are located between the divergent ends of the openings at 5 and 6 and register with corresponding openings 10 in the sides of the casing, apertures at 12 and 13 providing communication between the recesses 9 and the openings 5 and 6. The terminal block 4 is further provided with openings 14 and 15 that also diverge outwardly from each other at an angle of approximately 90° and between which and the recess 9 communication is afforded by means of apertures 16. The openings 10 in the sides of the casing are adapted to be covered by means of removable plates 17 when the instrument is in use.

Supported by and between terminal blocks 3 and 4 are two coils or windings 18 and 19 for U-shaped magnetizable cores 20 and 21 respectively, each of the coils being provided, upon opposite ends, with split tubular terminal pieces 22 and 23 that project respectively into the openings 5 and 6 of different terminal blocks. The coils here shown are adapted to conduct large amounts of current, and each comprises a loop 24 of comparatively heavy strap conductor that surrounds both legs of the U-shaped magnetizable core, and a piece 25 of T-shape, the main body of which is located between the legs of the U-shaped core and one end of which is secured to one side of the loop 24 by means of screws 26. The head of the T-shaped piece 25 is located between the opposite side of the loop and the magnetizable core and is extended outwardly from the plane of the loop and toward one end thereof, the terminal piece 22 being secured to or formed integral with its extremity. The terminal piece 23 is located at the opposite end of the loop and may be secured thereto in any suitable manner, as here shown or may be formed integral therewith. The structure of the coil constitutes the subject-matter of another application, Serial No. 314,210, filed by me of even date herewith.

The terminal pieces 22 and 23 are somewhat loosely fitted in the openings in the terminal blocks, and the coils 18 and 19 are spaced apart a distance equal to, or greater than, that between dotted lines 27 and 28 that are drawn parallel to the opposing edges of the coils. Thus, when one of the coils is moved toward and into engagement with the other coil, the terminal pieces 22 and 23 may be completely withdrawn from the openings in the terminal blocks, and the parts may consequently be readily assembled and dismantled.

The tubular terminal pieces 22 and 23 are provided with flanges 29 and 30 along the edges of the splits therein, the flanges being located in corresponding offsets from the cylindrical openings 5 and 6 in the terminal blocks. Screws 31, that are loosely fitted in one of the flanges and are threaded into the other, provide means whereby the tubular terminal pieces 22 and 23 may be clamped to cylindrical terminal pieces 32 and 33 for connection to an external circuit, the terminal pieces 32 and 33 projecting through the apertures in the casing 2 and the openings in the terminal blocks 3 and 4 into the tubular terminal pieces 22 and 23. The heads of the screws 31 are located in the apertures at 12 and 13. The terminal pieces 32 and 33 are surrounded by insulating sleeves 34 that extend into the terminal blocks 3 and 4 as far as annular flanges or shoulders 35 and prevent engagement of the terminal pieces with the casing 2. Rubber, felt or other resilient washers 36 are placed on the other sides of the flanges 35, between the same and the ends of the tubular terminal pieces 22 and 23, for the purpose of preventing dust from entering the casing through the openings in the terminal blocks.

Located in the apertures 14 and 15 in the block 4 are terminal pieces 37 that are surrounded by insulating sleeves 38 and in which are threaded screws 39 the heads of which are located in the apertures at 16, these terminal pieces being adapted to be connected to the shunt windings (not shown) of the instrument and to terminals (not shown) of an external circuit.

It will be observed that the heads of the clamping screws which are threaded into the terminal pieces are located in the apertures at 12, 13 and 16 and are accessible in the recesses 9 in the terminal blocks to enable adjustment thereof, the recesses 9 being shaped so that a screw-driver may be conveniently employed for effecting such adjustment.

The invention may be applied to other devices than electrical measuring instruments and the structural details and arrangement of the parts may be varied within considerable limits without departing from the spirit of the invention, and I desire that all such modifications shall be included within its scope.

I claim as my invention:

1. The combination with a pair of blocks having diverging openings, of two members each having diverging projections that extend respectively into the openings in different blocks.

2. The combination with a pair of blocks having diverging openings and recesses between the openings, of two members each having diverging projections that extend respectively into the openings of different blocks.

3. The combination with a pair of blocks having diverging openings and recesses between the openings, of two members each having diverging projections that extend respectively into the openings of different blocks, the diverging projections being provided with clamping means that are accessible in the recesses in the blocks.

4. The combination with a pair of blocks having diverging openings, of two members each having diverging projections that extend respectively into the openings of different blocks, the said members being spaced apart and movable toward each other a sufficient distance to permit removal of the diverging projections of one of the members from the openings in the blocks.

5. The combination with a pair of blocks having diverging openings and recesses between the openings, of two members each having diverging projections that extend respectively into the openings of different blocks, the members being spaced apart and movable toward each other a sufficient distance to permit removal of the diverging projections of one of the members from the openings in the block, and clamping means for the diverging projections that are accessible in the recesses in the blocks.

6. The combination with a pair of blocks having diverging openings, of two members each having diverging projections that extend respectively into the openings of different blocks, the said members being spaced apart and movable toward each other a sufficient distance to permit separation thereof from the blocks.

7. The combination with a pair of blocks having diverging openings, of two members each having diverging projections that extend respectively into the openings of different blocks, the said members being spaced apart and movable toward each other a sufficient distance to permit separation thereof from the blocks, and clamping screws that are threaded in the diverging projections and are accessible for adjustment in the recesses.

8. The combination with a pair of blocks having diverging openings and recesses between the openings, of two members each having diverging projections that extend respectively into the openings of different blocks, and clamping screws that are threaded in the diverging projections and are accessible for adjustment in the recesses.

9. In an electrical device, the combination with two windings having diverging terminal pieces, of insulating blocks each having diverging openings into which the terminal pieces of different windings project.

10. In an electrical device, the combination with two windings having diverging terminal pieces, of insulating blocks each having diverging openings into which the terminal pieces of different windings project, the windings being spaced apart and movable toward each other a sufficient distance to permit separation of the windings from the blocks.

11. In an electrical device, the combination with two windings having diverging terminal pieces, of a pair of insulating blocks each having openings into which the terminal pieces of different windings project and recesses between the openings, and clamping means for the terminal pieces that are accessible in the recesses.

In testimony whereof, I have hereunto subscribed my name this 23rd day of April, 1906.

WILLIAM M. BRADSHAW.

Witnesses:
PAUL MACGAHAN,
BIRNEY HINES.